BEST AVAILABLE COPY

T856030

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 669

671,196

CYANOMETHYLIDENE AND VINYL SULFONYL ETHYL SUBSTITUTED BENZENES AND TETRA HYDRO QUINOLINES

James M. Straley, John I. Dale III, and Max A. Weaver, all % Tennessee Eastman Company, P.O. Box 511, Kingsport, Tenn. 37662

Filed Sept. 28, 1967. Published Nov. 19, 1968

Class 260—287

No Drawing. 20 Pages Specification

Novel compounds containing a cyanomethylidene group and a vinylsulfonylethyl group attached to a phenylene or tetrahydroquinoline nucleus are useful as dyes for hydrophobic textile materials imparting red-yellow shades.